Aug. 25, 1964 C. F. CAFOLLA 3,145,598
SUPPORT
Filed May 25, 1961 2 Sheets-Sheet 1
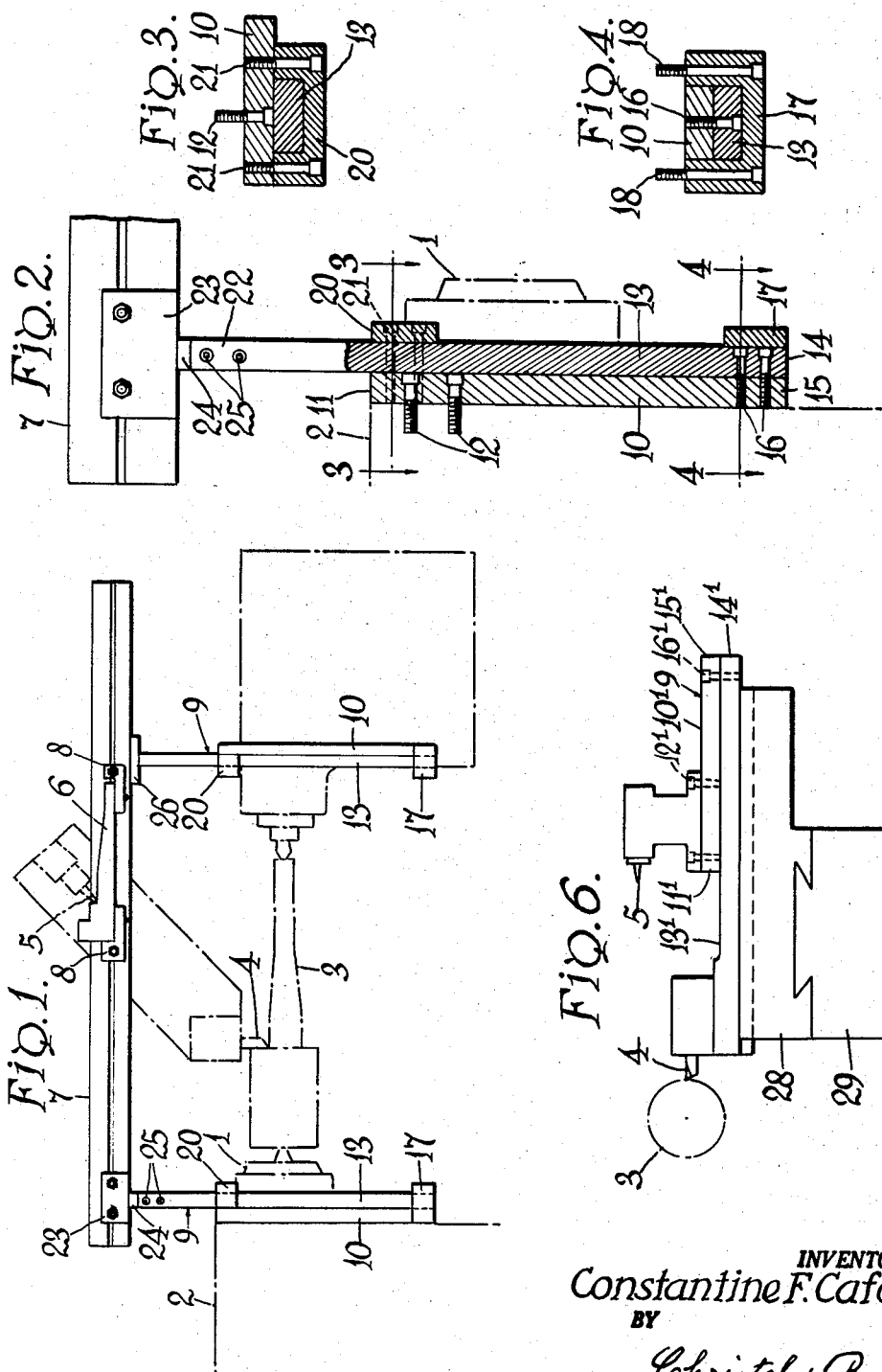
INVENTOR.
Constantine F. Cafolla,
BY
Christel + Bean
ATTORNEYS

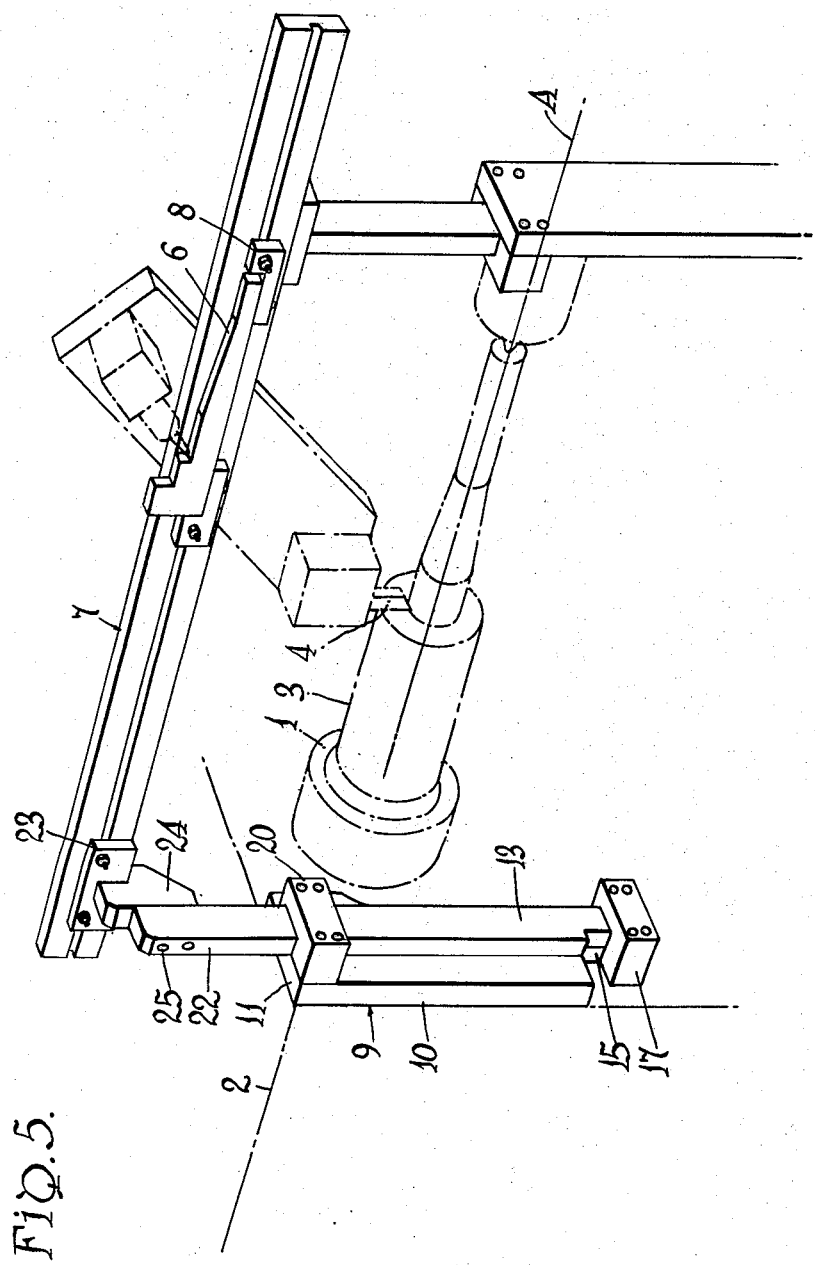

United States Patent Office 3,145,598
Patented Aug. 25, 1964

3,145,598
SUPPORT
Constantine F. Cafolla, Waterloo, N.Y., assignor to Seneca Falls Machine Company, Seneca Falls, N.Y.
Filed May 25, 1961, Ser. No. 112,581
5 Claims. (Cl. 82—14)

This invention relates generally to the support art. More specifically, it relates to a new and useful mounting unit adapted to support one part, such as a contour template or a tracing stylus, in predetermined, spaced relation to another part, such as a spindle or a cutting tool, and to maintain the desired spacing therebetween despite changes in ambient temperature. While not necessarily limited thereto, this invention is particularly directed to the machine tool art.

In tracer turning operations for example, it is essential that a predetermined spacing be maintained between the spindle center line and the template, if accuracy is desired. The same is true of the spacing between a tracing stylus and the cutting tool controlled thereby. Customarily, contour templates are carried by bars which are fastened to brackets mounted on the headstock, tailstock and/or other machine part, and such mounting brackets enable the template to be initially positioned very accurately relative to the spindle center line.

However, as the operation progresses heat is generated, causing an increase in the ambient temperature. This in turn causes the usual template mounting brackets to expand, with the result that the template is shifted out of its predetermined position relative to the spindle center line, thereby causing drift of the required tolerances for the part being machined.

Accordingly, the primary object of my invention is to provide a mounting unit which will support a part, such as a template or stylus, in predetermined relation to another part, such as a spindle center line or cutting tool, and will maintain such predetermined relation with changes in the ambient temperature.

Another object of my invention is to provide the foregoing in a mounting unit which is relatively simple and inexpensive in construction, readily installed, and durable and dependable in operation.

In one aspect thereof, a mounting unit constructed in accordance with my invention is characterized by the provision of a first mounting member adapted to be secured adjacent one end thereof in fixed relation to a machine tool part, such as a spindle, the first mounting member having an opposite end portion free to expand and contract lengthwise of the first mounting member, and a second mounting member secured adjacent one end thereof in fixed relation to the opposite end portion of the first mounting member for movement therewith, the second mounting member extending from its fixed end generally toward the fixed end of the first mounting member and having an opposite end portion free to expand and contract lengthwise of the second mounting member relative to the first mounting member, the opposite end portion of the second mounting member being adapted to be secured to another machine tool part, such as a template, or its support bar, the first and second mounting members having different coefficients of linear expansion and the relative distances between the opposite ends of the first and second mounting members being such that the machine tool parts are maintained in a predetermined relative position with changes in the ambient temperature.

The foregoing and other objects, advantages and characterizing features of my invention will become clearly apparent from the ensuing detailed description of a presently preferred embodiment thereof, taken in conjunction with the accompanying drawings showing two installations of such embodiment on a tracer lathe, wherein like reference numerals denote like parts throughout the various views and wherein:

FIG. 1 is a diagrammatic side elevational view of a tracer lathe, showing a contour template supported therein by a pair of mounting units of my invention;

FIG. 2 is an enlarged fragmentary view of one of the mounting units of FIG. 1, showing the same partly in side elevation and partly in longitudinal section;

FIG. 3 is a transverse sectional view thereof, taken about on line III—III of FIG. 2;

FIG. 4 is a transverse sectional view thereof, taken about on line IV—IV of FIG. 2;

FIG. 5 is an enlarged, fragmentary, perspective view thereof; and

FIG. 6 is a schematic view showing a tracing stylus supported on a tool slide by a mounting unit of my invention.

The accompanying drawings show a tracer lathe having a spindle and work driver 1 extending from the headstock 2 and driving a work piece 3. The cutting tool 4 is under control of a tracing stylus 5 engaging a contour template 6 which is adjustably secured to a bar 7 by clamps 8. The foregoing lathe parts are conventional, and comprise no part per se of my invention which instead resides in the mounting units 9.

The illustrated embodiment of my invention comprises a first mounting member 10 secured adjacent its upper end 11 to the machine headstock 2, as by fastening screws 12. The end 11 of member 10 is thereby held in fixed relation to headstock 2 and spindle 1. The first mounting member 10 extends downwardly from its fixed end 11, and is otherwise free to undergo linear expansion and contraction. A second mounting member 13 is secured adjacent its lower end 14 to the free lower end 15 of member 10 as by fastening screws 16. Thus, member 13 is fixed to the free end of member 10 for movement therewith as the latter expands and contracts. The second mounting member 13 extends upwardly from its fixed end 14 toward and, in the illustrated embodiment, beyond the fixed end 11 of member 10. Member 13 is otherwise free to undergo linear expansion and contraction relative to member 10.

To guide member 10 as it expands and contracts, carrying with it the end 14 of member 13, I provide a generally U-shaped member 17 extending around mounting members 10 and 13 adjacent their lower ends 15 and 14. Guide member 17 is carried by headstock 2, or another part of the machine, being secured thereto as by fastening screws 18 (FIG. 4). A second guide member 20 is provided adjacent the fixed, upper end 11 of member 10. Guide 20 also is U-shaped, but encloses and guides only member 13 and can be secured to member 10, as by fastening screws 21.

The upper end 22 of member 13 is free to move relative to the fixed end 14 and to the member 10, thereby to accommodate linear expansion and contraction of member 13 during temperature changes. Template support bar 7 is secured to the upper end 22 of member 13, as by a clamping plate 23 carried by a bracket 24 secured to the free end 22 of mounting member 13, as by fastening screws 25.

The first and second mounting members 10 and 13 are formed of materials having different co-efficients of expansion, such as for example aluminum and steel, respectively. Because the co-efficient of thermal expansion of aluminum is about twice that of steel, member 13 will have approximately twice the length of member 10. In this way, as heat is generated in the headstock area, causing the ambient temperature to rise, member 10 will expand downwardly, carrying member 13 with it. However, member 13 will expand upwardly, and because the respective lengths and co-efficients of expansion have been selected to balance one another, the net effect of the temperature change will be zero insofar as linear expansion is concerned. The total linear expansion of member 10 is in one direction, and is equaled and cancelled by the total linear expansion of member 13 in the opposite direction. As a result, template support bar 7, and template 6 will maintain a predetermined spaced relation to the spindle center line.

Obviously, materials other than aluminum and steel can be used for members 10 and 13. When that is done, the relative lengths of members 10 and 13 will be selected so that the linear expansion of one member will be exactly counter-balanced by the linear expansion of the other member. In other words, the length of member 10 between its ends 11, 15, times its coefficient of expansion, should equal the length of member 13 between its ends 14, 22, times its coefficient of expansion, for a given temperature change.

Often, one mounting unit 9 will suffice. A second mounting unit can be provided, on the tailstock for example, as shown in FIG. 1, being secured to bar 7 by a bracket 26. The two mounting units will operate in the manner described above with reference to one of them, to maintain a predetermined spacing between the template and the spindle center line.

Also, the mounting unit of my invention is not limited to the support of a template bar. This is clearly evidenced by FIG. 6 showing a mounting unit of my invention used to support the tracing stylus 5 relative to the cutting tool 4. Stylus 5 is fastened to the end of a first mounting member 10' as by fastening screws 12'. The end 15' of member 10 is fixed relative to the end 14' of a second support member 13', as by fastening screws 16'. In this instance, the second support member 13' comprises the slide for cutting tool 4, being arranged for transverse movement in the slide carriage 28 which is movable longitudinally along the machine bed 29 in a manner readily understood in the art. Guide members corresponding to 17 and 20 can be provided.

As described with reference to FIGS. 1–5, the relative lengths and coefficients of expansion of members 10' and 13' are so selected that, as the ambient temperature rises, the expansion of member 13' will balance and nullify the expansion of member 10'. A predetermined relation is thereby maintained between stylus 5 and cutting tool 4.

Obviously, the mounting unit of my invention will find utility in other applications.

The foregoing embodiment of my invention, and specific applications thereof are given by way of illustration only, without though of limitation, it being intended that the scope of my invention be defined by the appended claims.

Having fully disclosed and completely described my invention, together with its mode of operation, what I claim as new is:

1. Support means for maintaining a predetermined spaced relation between a first machine tool part and a second machine tool part during changes in ambient temperature comprising, a first elongated mounting member secured adjacent one end portion thereof in fixed relation to said first machine tool part, said first mounting member having an opposite end portion free to expand and contract linearly, a second elongated mounting member secured adjacent one end portion thereof in fixed relation to said opposite end portion of said first mounting member for movement therewith during expansion and contraction thereof, said second mounting member extending from said one end thereof generally toward said one end portion of said first mounting member and having an opposite end portion free to expand and contract linearly relative to said first mounting member, the relative lengths and coefficients of linear expansion of said first and second mounting members being balanced whereby expansion of said first mounting member is countered by the expansion of said second mounting member upon a rise in ambient temperature, and means securing said second machine tool part to said opposite end portion of said second mounting member for being supported thereby, together with a first guide member fixed relative to said first machine tool part and slidably engaging said first and second mounting members adjacent said one end portion of said second mounting member, and a second guide member fixed relative to said first mounting member adjacent said one end thereof and slidably engaging said second mounting member, said guide members constraining said mounting members against lateral movement while enabling linear expansion thereof.

2. Support means for maintaining a predetermined spatial relation between a first machine tool part and a second machine tool part comprising, a first mounting member secured against movement relative to said first machine tool part at a first point on said first mounting member, a second mounting member, said second machine tool part being supported by said second mounting member at a first point on said second mounting member, said first and second mounting members being secured against movement relative to each other at a second point spaced from both of said first points in the same general direction along said first and second mounting members, the relative lengths and coefficients of thermal expansion of said first and second mounting members producing a total linear expansion of said first mounting member substantially equal and opposite to the total linear expansion of said second mounting member upon a predetermined increase in ambient temperature, together with a first guide member fixed relative to said first machine tool part and slidably engaging said first and second mounting members adjacent said second point, and a second guide member fixed relative to said first mounting member adjacent said first point thereon and slidably engaging said second mounting member, said guide members constraining said mounting members against lateral movement while enabling linear expansion thereof.

3. A mounting unit for supporting one machine tool part in predetermined relation to another machine tool part comprising, in combination with said parts, an elongated first mounting member connected adjacent one end thereof to said other machine tool part against movement relative thereto, said first mounting member being otherwise free to undergo linear expansion in a direction toward the opposite end thereof, an elongated second mounting member connected adjacent one end thereof to said first mounting member adjacent said opposite end thereof for movement with said opposite end of said first mounting member as the latter undergoes linear expansion, said second mounting member being otherwise free to undergo linear expansion in the opposite direction toward the opposite end thereof, said one machine tool part being connected to said second mounting member adjacent said opposite end thereof, the relative lengths and coefficients of linear expansion of said first and second mounting members producing substantially equal and opposite linear expansion thereof upon and increase in ambient temperature, together with a first guide member fixed relative to said other machine tool part and slidably engaging said first and second mounting members adjacent said one end of said second mounting member, and a second guide member carried by said first mounting member adjacent said one end thereof and slidably engaging said second mounting member, said guide members constraining said mounting members against lateral movement while enabling linear expansion thereof.

4. A mounting unit as set forth in claim 3, wherein said one part comprises a template bar of a tracer lathe and said other part comprises the headstock thereof.

5. A mounting unit as set forth in claim 3, wherein said one part comprises the cutting tool of a tracer lathe and said other part comprises a tracer stylus.

References Cited in the file of this patent
UNITED STATES PATENTS

| | | |
|---|---|---|
| 1,653,824 | Ruth | Dec. 27, 1927 |
| 2,957,392 | Zwick et al. | Oct. 25, 1960 |